United States Patent [19]

Hartman Peter W. et al.

[11] Patent Number: 4,479,207

[45] Date of Patent: Oct. 23, 1984

[54] LOAD DETECTING SYSTEM FOR AUTOMATIC STORAGE APPARATUS

[75] Inventors: Hartman Peter W., Pittsford; Patsy R. Brown, Rochester, both of N.Y.

[73] Assignee: Hartman Material Handling Systems, Inc., Victor, N.Y.

[21] Appl. No.: 359,794

[22] Filed: Mar. 19, 1982

[51] Int. Cl.³ .................. G01S 15/10; G01S 15/88
[52] U.S. Cl. ........................... 367/107; 367/108; 367/112
[58] Field of Search .............. 367/87, 93, 96, 118, 367/99, 107, 108, 112

[56] References Cited

U.S. PATENT DOCUMENTS

| | | | |
|---|---|---|---|
| 3,114,128 | 12/1963 | Ljungman et al. | 367/93 X |
| 3,223,964 | 12/1965 | Stadlin | 367/96 |
| 3,681,607 | 8/1972 | Hartman | 250/222 |
| 3,757,285 | 9/1973 | Ferré | 367/108 |
| 3,893,094 | 7/1975 | Thorson et al. | 367/96 X |
| 4,167,316 | 9/1979 | Johnson et al. | 354/195 |
| 4,199,246 | 4/1980 | Muggli | 354/197 |
| 4,291,965 | 9/1981 | Johnson et al. | 354/195 |
| 4,294,531 | 10/1981 | Shenk | 354/195 |
| 4,420,751 | 12/1983 | Paganini et al. | 367/96 X |

*Primary Examiner*—Richard A. Farley
*Attorney, Agent, or Firm*—Lee H. Kaiser

[57] ABSTRACT

Apparatus for detecting a load within a preselected bin of an automatic storage rack has a transducer for directing an ultrasonic beam into the bin and for detecting an echo reflected from a load struck by the beam; a digital counter adapted to generate plural bit binary pulses which is started upon initial transmission of the ultrasonic beam; and a programmable memory coupled to the counter and programmed to generate a given bin-ful output signal upon initial transmission of the beam and to subsequently generate the opposite binary bin-empty output signal if no echo has been detected when the pulses from the counter stored in the memory indicate that sufficient time has elapsed after initial transmission for the beam to travel a predetermined distance into the bin and for an echo from a load struck by the beam to return to the transducer.

18 Claims, 6 Drawing Figures

LOAD DETECTING SYSTEM FOR AUTOMATIC STORAGE APPARATUS

FIELD OF THE INVENTION

This invention relates to automatic storage apparatus and more particularly to a novel system for detecting the presence or absence of a load in a preselected bin of a storage rack that is serviced by an automatic stacker.

BACKGROUND OF THE INVENTION

The invention relates to a load detecting method and means for automatic storage and retrieval apparatus in which an automatically operated load-bearing stacker is movable down an aisle between a pair of spaced storage racks containing a plurality of vertically and horizontally spaced bins, or bays, the open ends of which confront one another on opposite sides of the aisle. The stacker conventionally has a vertically movable carrier which supports a retractable fork mechanism on a trolley that is movable laterally out of either side of the lifting carriage to service the racks. A combination receiving and discharge station may be located at the head of the aisle where incoming loads are picked up by the fork mechanism for deposit in a preselected bin and where outgoing loads are deposited by the fork mechanism after removal from one of the bins in response to instruction signals from a programmable controller.

Mechanical feelers were provided on earlier prior art stackers which, when the carrier had been positioned in registry with a preselected bin, projected into the bin to detect the presence or absence of a load therein. Such mechanical feelers had the disadvantages that they might not detect the presence of a load positioned near the back of a bin and also that the mechanically operated parts from which they were constructed often accidentally became damaged during operation or, in time, wore out and had to be replaced. More recent stackers have load detectors which utilize reflected light rays and photocells for sensing the presence or absence of a load in a preselected bin of a storage rack. However, such stackers utilizing reflected light rays to detect a load necessitate installation and maintenance of brackets supporting reflectors at the rear of each bin which involves considerable initial and maintenance costs and does not provide a fail-safe indication of the presence or absence of a load in the bin.

OBJECTS OF THE INVENTION

It is an object of the invention to provide a novel method and means for detecting a load in a preselected bin of a storage rack which eliminates the necessity and cost of installing and maintaining brackets and reflectors at the rear of each bin. Another object is to provide such load detecting method and apparatus which is fail-safe in operation. A further object is to provide such fail-safe method and means for detecting a load in a preselected bin of a storage rack which requires a reflection even if no loads are present in the bin and senses the absence of such reflection and gives an indication of a fault when no reflection is received.

It is a further object of the invention to provide such novel load detecting method and apparatus which can be utilized with storage racks having plural loads stored in horizontally spaced apart front and rear positions in the same bin along the path of travel of the fork, such as a "double-deep" rack, and provides a fail-safe indication as to whether a load is in the front and/or rear positions in the bin.

Still another object is to provide such novel load detecting system which does not require reflectors supported on brackets at the rear of the bin to detect a load within the bin and provides a positive response if a load is present regardless of extreme differences in the character and configuration of the loads.

SUMMARY OF THE INVENTION

The load detecting method and apparatus of the invention transmits an ultrasonic beam into a preselected automatic storage rack bin and detects an echo reflected from any load within the bin struck by the beam and converts the elapsed time between initial transmission and echo detection into distance with respect to the speed of sound to determine the position of the load within the bin. Apparatus in accordance with the invention for detecting a load within a preselected bin of an automatic storage rack has means including a transducer positioned adjacent the open end of the rack for directing an ultrasonic beam into the bin and for detecting an echo of the ultrasonic beam, and means for generating a bin-empty indication when no echo is detected within the time interval required for the ultrasonic beam to travel a predetermined distance into the bin and for a echo from a load struck by the beam to return to the transducer. Preferably the means for generating a bin-empty indication includes a digital counter which is started upon initial transmission of the ultrasonic beam and is adapted to generate plural bit pulses indicative of the count therein and proceeds to a first predetermined count in the time interval required for the ultrasonic beam to travel said predetermined distance into the bin and the echo to return, and a programmable memory coupled to the digital counter is programmed to generate a given binary bin-full output signal from initial transmission until the pulses from the counter stored in the memory indicate that the counter has proceeded to such predetermined count without detection of an echo and to thereafter generate the opposite binary bin-empty output signal.

The apparatus of the invention is capable of detecting loads stored within double-deep bins having front and rear load positions. Preferably the digital counter will progress to a second predetermined count after the time interval required for the ultrasonic beam to travel through the bin front position and a predetermined distance into the bin rear position and for an echo from a load struck by the ultrasonic beam to return to the transducer, and the memory means is programmed to generate, in response to a rear position scan input signal, the given binary bin-full signal from initial transmission of the ultrasonic beam until the pulses from the counter stored in the memory show that the counter has progressed to such second predetermined count without detection of an echo and to thereafter generate the opposite binary bin-empty output signal. The apparatus of the invention is fail-safe in that the ultrasonic beam will reflect off the rear of the bin, and the memory is programmed to generate a fault output signal when, if no echo has been detected, the pulses from the digital counter stored in the memory show that a time interval after initial transmission has elapsed greater than that required for the ultrasonic beam to travel at the speed of sound to and strike the rear of the bin and the reflected echo to return the transducer, thereby indicating a faulty transducer or faulty wiring or that the transducer is improperly aligned.

BRIEF DESCRIPTION OF THE DRAWINGS

Other objects and advantages of the invention will be more readily apparent from the following detailed description when considered in conjunction with the appended claims and accompanying drawing wherein:

DETAILED DESCRIPTION OF A PREFERRED EMBODIMENT

Figure 1:
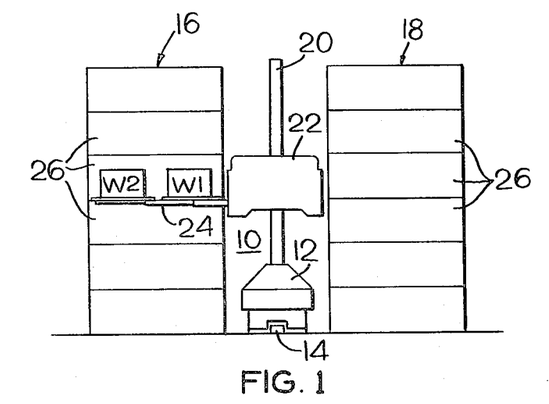
FIG. 1 is an end elevation and FIG. 2 is a fragmentary plan view illustrating schematically an automatic stacker and a pair of "double-deep" storage racks incorporating a load detecting system in accordance with a preferred embodiment of the invention.
Figure 2:
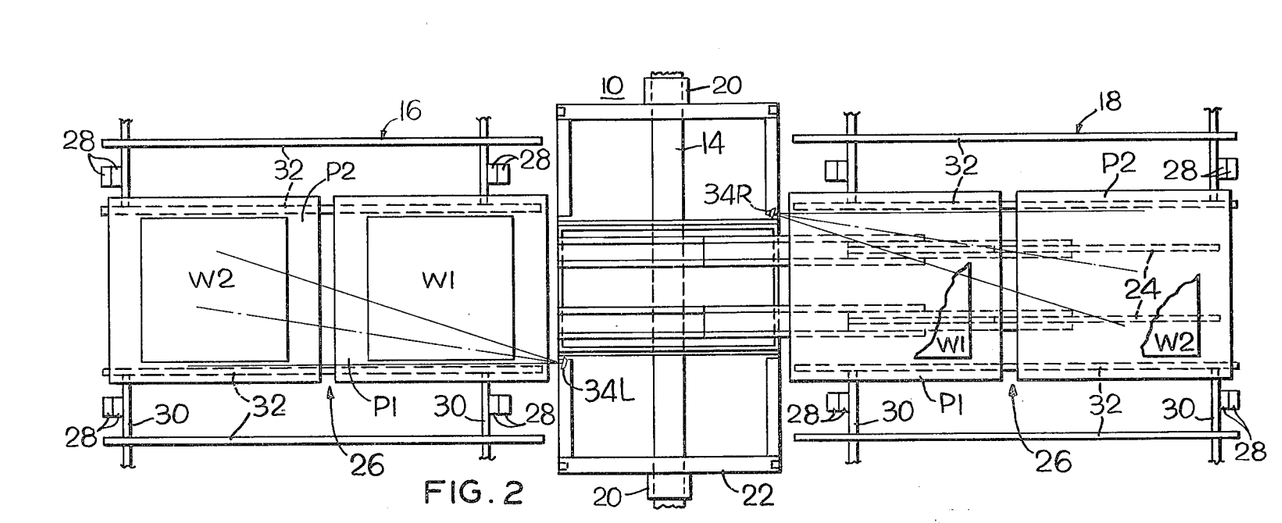
Figure 3:
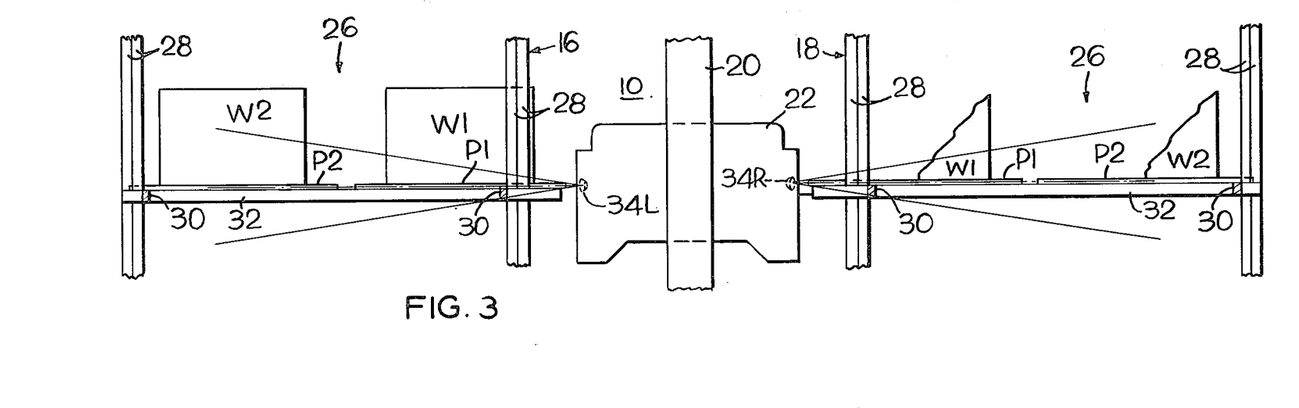
FIG. 3 is a fragmentary side elevation view of double-deep bays in opposite racks and illustrating the mounting position of the load detecting means when the stacker is in registry with a bay.

Referring now to FIGS. 1-3 of the drawing, 10 designates the stacker generally which includes a trolley portion 12 which is movable along a rail 14 between spaced left and right storage racks 16 and 18 respectively. Trolley 12 carries a mast 20 on which there is vertically movable a lifting carriage 22 which supports a laterally movable transfer mechanism, or shuttle, comprising a pair of retractable, load-bearing forks 24. Each rack such as 16 and 18 is divided into a plurality of vertically and horizontally spaced bays, or bins 26. In each rack bins 26 have open ends facing rail 14 and are disposed in horizontal rows and vertical columns, and the bins 26 at one side of the aisle register with the bins 26 at the other side of the aisle. Vertically movable lifting carriage 22 carries the retractable load-bearing forks 24 which are capable of extending out of either side of lifting carriage 22 into a bin 26 of left rack 16 or bin 26 of right rack 18 and picking up, or depositing, a first load W1 at the front position of the bin 26 and/or a second load W2 at the rear position of the bin. Each rack 16 or 18 may comprise a plurality of vertical members 28 (FIGS. 2 and 3) disposed adjacent the front and rear ends and near the outer sides of each bay 26 and which are affixed to horizontal front and rear crosspieces 30 extending parallel to track 14. Secured to front and rear crosspieces 30 at the bottom of each bin 26 are two spaced, parallel, horizontally disposed pallet-supporting beams 32 which extend from the front to the rear of rack 16 or 18. Racks 16 and 18 are illustrated as being of the "double-deep" type in which a pair of pallets P1 and P2 carrying loads W1 and W2 may be supported on beams 32 so that loads W1 and W2 are horizontally spaced in a direction parallel to the path of retractable forks 24 in front and rear positions respectively within the same bin 26.

Mounted on opposite sides of elevator 22 to face left and right racks 16 and 18 respectively are two ultrasonic electrostatic transducers 34L and 34R each of which acts as both a loudspeaker to transmit an outgoing ultrasonic signal and as an electrostatic microphone to receive the reflected echo. Ultrasonic electrostatic transducers 34L and 34R are preferably components of an ultrasonic ranging system commercially available from Polaroid Corporation and of the type disclosed in U.S. Pat. Nos. 4,199,246 and 4,294,531. Such ultrasonic ranging system includes an electronic circuit board PC1 (FIG. 4) that controls the transmit/receive mode of transducers 34L and 34R and includes a digital circuit DC (FIG. 5), a analog circuit AC, and a power interface circuit P1C. When power is applied to electronic circuit board PC1 over a lead VSW as described hereinafter, transmission of an ultrasonic pulse by transducer 34L or 34R is initiated, and the transducer then waits to receive an echo returning from a load such as W1 or W2 that the ultrasonic pulse may strike. The pulse emitted from transducer 34L or 34R is a high frequency inaudible chirp preferably lasting approximately one millisecond and consisting of fifty-six pulses at four ultrasonic frequencies of 60 kHz, 57 kHz, 53 kHz and 50 kHz to assure that no single frequency is cancelled and that an echo is always reflected from a load W1 or W2 regardless of its configuration or characteristics. A crystal controlled clock CLOCK in the digital section of the electronics board PC1 generates the ultrasonic frequencies that comprise the pulse transmitted by the transducer 34L or 34R. The beam pattern of a transducer 34 is a cone with an approximate 9° angle from the center of the transducer, as schematically illustrated in FIGS. 2 and 3, and transducers 34L and 34R are preferably mounted on lifting carriage 22 slightly above the upper level of and slightly inward from a pallet-supporting beam 32 so that the face of transducer 34 is generally perpendicular to a load W1 or W2 when elevator 22 is in registry with a bin 26.

Figure 6:
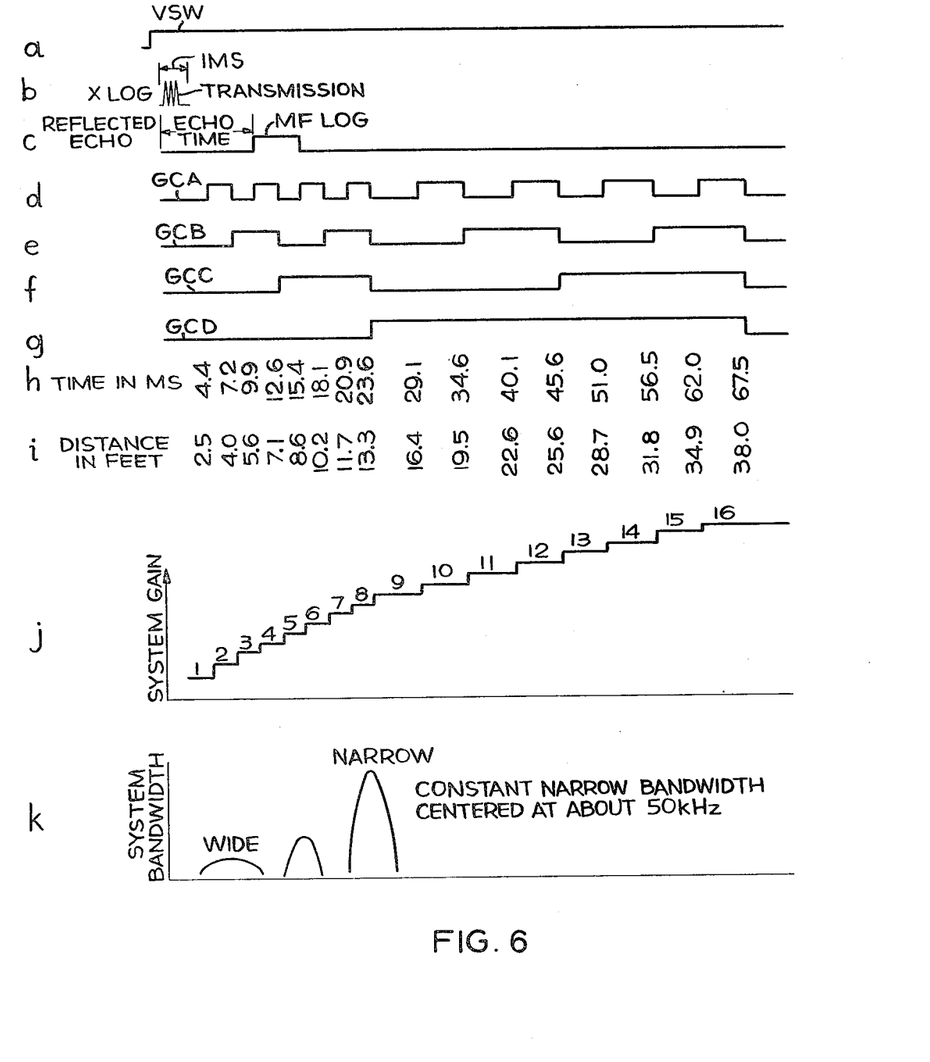
FIG. 6 schematically illustrates electrical signals within the load detecting system.

In operation, an ultrasonic pulse is transmitted by a transducer 34 toward a load W1 or W2 within a bin 26 and the resulting echo is detected. The elapsed time between initial transmission and echo detection is converted by electronic circuit board PC1 to distance with respect to the speed of sound. For a transmitted pulse to leave transducer 34, strike a load W1 two feet away and return to the transducer requires an average time lapse of 3.55 milliseconds. The relationship between distance and time is shown in FIGS. 6h and 6i. Upon receiving an echo, the transducer 34 converts the sound energy to electrical energy which is amplified by analog circuit AC and then detected by the digital circuit DC to produce the echo received output signal MFLOG (FIG. 6c).

The analog circuit amplifier AC processes the echo and also performs the function of maintaining a tailored sensitivity over the entire operating range (distance covered) of the system. Lower amplification is needed for close echoes while higher amplification is needed for distant echoes. As illustrated in FIGS. 6j and 6k, the change in amplification, designated SYSTEM GAIN, within analog circuit AC is accomplished by increasing the gain and the Q of the amplifier in eight steps, out to 13.3 feet, and then by increasing the gain of the amplifier, again in eight steps, beyond 13.3 feet.

Figure 4:
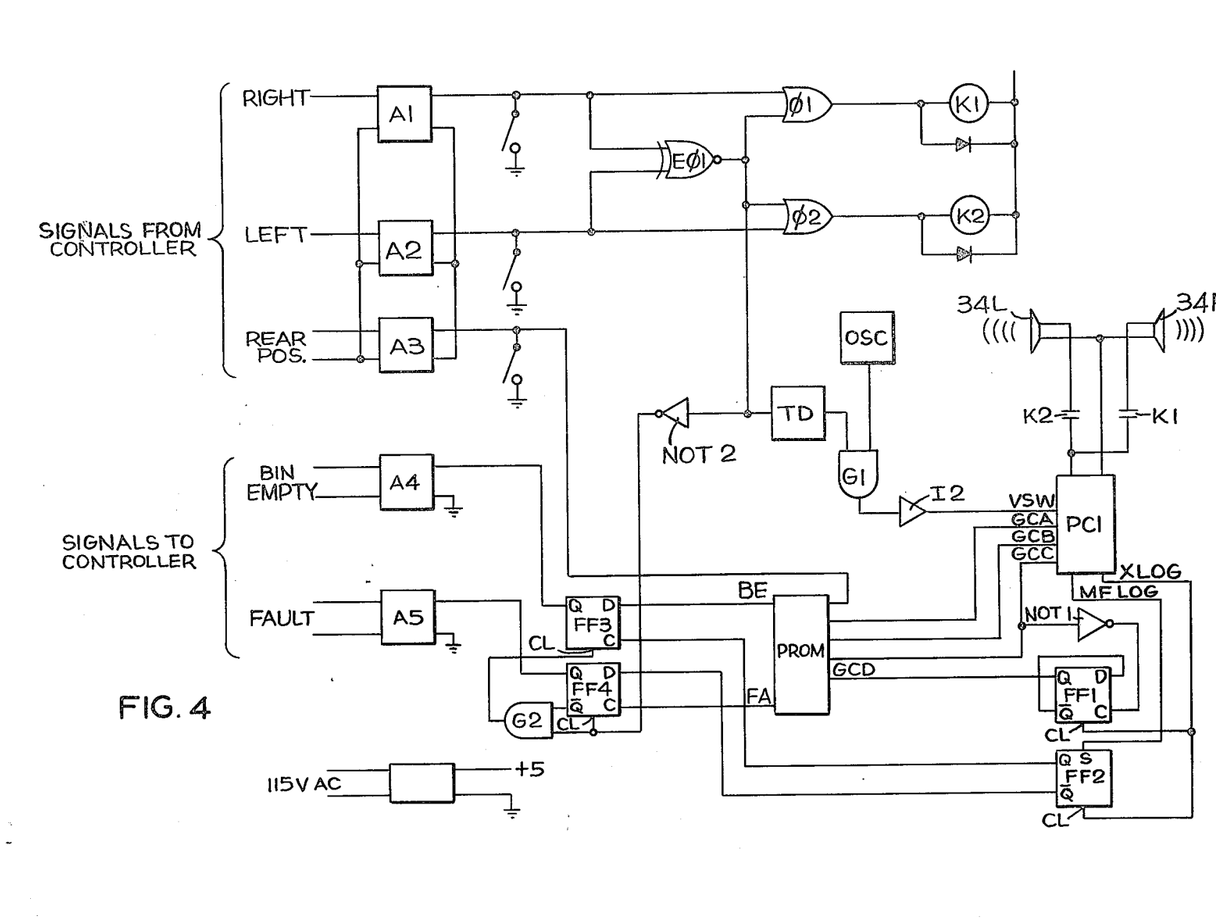
FIG. 4 is a wiring diagram illustrating one manner in which a load detecting system in accordance with the invention may be connected to the programmable controller of the automatic stacker.
Figure 5:
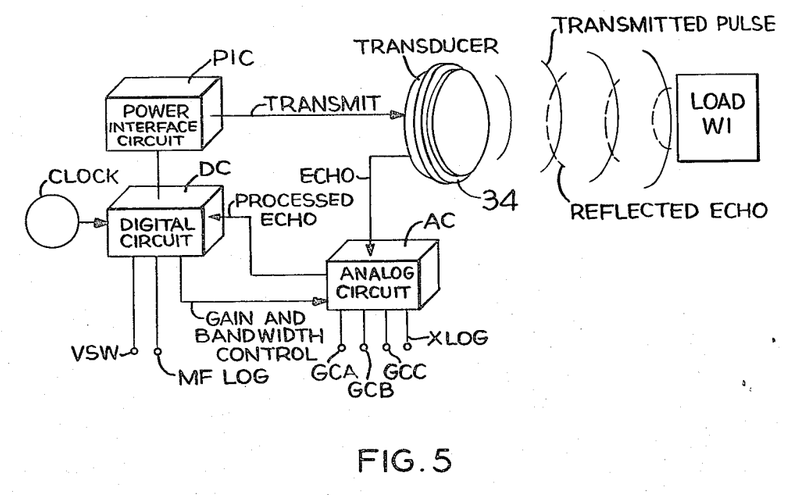
FIG. 5 is a schematic representation of interconnections between different circuits of the load detecting means.

Automatic operation of the ultrasonic means for detecting a load W1 and W2 in a bin 26 is initiated by a request from a programmable controller (not shown) through three interface input lines designated LEFT, RIGHT and REAR POSITION (FIG. 4). The reply of the load detecting means to the programmable controller is through two interface output lines designated BIN EMPTY and FAULT. The REAR POSITION input is used only on double-deep racks to instruct the load detecting means that the rear load position in the bin 26 is to be scanned. An instruction signal on interface input line LEFT or RIGHT from the programmable controller as to whether a bin 26 in left rack 16 is to be checked for the presence or absence of a load or whether a bin 26 in right rack 18 is to be scanned results in energization of left transducer 34L or right transducer 34R. Lines LEFT, RIGHT, and REAR POSITION are connected to optical isolator coupling circuits A1, A2 and A3 whose outputs are at TTL logic levels and are inputs, respectively, to an OR gate ∅1, an OR gate ∅2, and a programmable read only memory PROM such as type I.C. TBP18SA030N commercially available with a blank program from Texas Instruments, Inc. If, for example, an instruction signal appears on the RIGHT input interface line from the programmable controller, a logic 0, or low signal is applied by optical isolator coupling circuit A1 to an input of OR gate ∅1 which in response thereto and a logic 0, or low signal from exclusive NOR gate E∅1 (which produces a low output when its inputs are not identical) provides a logic 0, or low output which is coupled to one side of the coil of a reed relay K1 having its opposite side connected to a +5 V power supply, thereby resulting in operation of relay K1 and closure of its K1 contacts to connect transducer 34R to electronic circuit board PC1. Similarly, an instruction signal on LEFT input interface line from the programmable controller results in a logic 0 signal from optical isolator circuit A2 being applied to an input of OR gate ∅2 which then provides a logic 0, or low output that is coupled to one side of the coil of a reed relay K2, the opposite side of which is coupled to the +5 V power supply, thereby resulting in closure of its contacts K2 which connects transducer 34L to electronic circuit board PC1. Exclusive NOR gate E∅1 has its inputs coupled to the outputs from optical isolating couplers A1 and A2 and its output coupled to one input of both OR gates ∅1 and ∅2 to prevent simultaneous logic 0, or low outputs from OR gates ∅1 and ∅2 and thus prevent accidental simultaneous energization of both left and right transducers 34L and 34R.

When an instruction signal appears on either LEFT or RIGHT input interface line from the programmable controller, exclusive NOR gate E∅1 receives a logic 1 signal or one input and a logic 0 signal on its other input and provides a logic 0 output to the input of a suitable time delay circuit TD which provides a 0.25 second delay. The delayed logic 1, or high signal from circuit TD is coupled to an input of an AND gate G1 which receives output pulses from an oscillator OSC on its other input. Oscillator OSC preferably generates pulses of approximately 100 millisecond width which are coupled through gate G1 and an amplifier I2 to the VSW input of electronics circuit board PC1 and initiates a transmit/receive cycle within the ultrasonic ranging system approximately ¼ second after the programmable controller has requested that a bin 26 be checked. In response to the VSW input pulse (see FIG. 6a) electronics circuit board PC1 transmits a drive signal XLOG through contacts K1 or K2 to left transducer 34L or right transducer 34R which consists of eight cycles at 60 kHZ, eight cycles at 57 kHZ, sixteen cycles at 53 kHZ and twenty-four cycles at 50 kHZ for a total of fifty-six cycles and lasts for a total of approximately one millisecond. The energized transducer 34L or 34R acts as a loudspeaker and emits such high frequency pulse and then waits to receive an echo returning from a load W1 or W2 struck by the emitted pulse. FIG. 6b schematically illustrates such emitted pulse XLOG, and FIGS. 6j and 6k represent that the electronics circuit board PC1 increases the gain and the Q of the analog amplifier circuit in eight steps while the emitted pulse is traveling out to 13.3 feet and then increases the system gain, again in eight steps, beyond 13.3 feet. Pulse XLOG also appears on output lead XLOG (FIG. 4) from electronics circuit board PC1 and is applied to the clear inputs CL of two flip-flop FF1 and FF2 and clears them in preparation for another transmit/receive cycle.

While the emitted high frequency pulse is traveling toward a load W1 or W2 to be detected, a three stage digital counter (not shown) within electronics circuit board PC1 is generating binary digital pulses GCA, GCB and GCC shown in FIGS. 6d, 6e and 6f which control gain of the ultrasonic ranging system in the manner illustrated in FIG. 6j. Pulses GCA, GCB and GCC are extracted from PC1 and applied as inputs to memory PROM which is programmed to deduce from the state of the count when an echo (such as MFLOG-FIG. 6c) is detected whether the bin is loaded or empty. Memory PROM also receives an input over a GCD lead from the Q output of flip-flop FF1 whose clock (C) input is coupled through an inverting gate NOT 1 to the GCC counter output lead from electronics circuit board PC1 to develop a fourth counter stage. A fifth input to read-only memory PROM is from the output of the optical isolator coupler A3 which receives a rear position scan instruction signal from the programmable controller over the REAR POSITION interface input line so that optical isolator circuit A3 provides a logic 1, or high signal input to PROM when the front position of a bin 26 is to be scanned and a logic 0, or low signal input when the rear position in a bin 26 is to be scanned. FIGS. 6d, 6e, 6f and 6g illustrate the binary output pulses from the digital counter on input lines GCA, GCB, GCC and GCD to read-only memory PROM as a high frequency pulse XLOG from a transducer 34 is traveling in an empty double-deep bin 26 where the loads are each approximately 48" deep and a reflection of the back of bin 36 for detection of a totally empty bin would be approximately 10 feet away. The ultrasonic beam has a cone diameter of 9.5" after it travels 2.5 feet and a cone diameter of 27" at 7.1 feet away and will reflect from the crosspieces such as 30 at the rear of the bin.

The following table A shows: (a) the five inputs to PROM and, (b) the two BE (bin-empty) and FA (fault) outputs therefrom versus distance of the load from a transducer 34 when the programmable controller instruction on the interface lines requests scan of the front bin position of a double-deep system for loads that are 40 inches deep by applying a logic 1, or high (H) signal on the REAR POSITION input to PROM:

TABLE A

| SEEKING FRONT POSITION | | | | | | | |
|---|---|---|---|---|---|---|---|
| Inputs to PROM | | | | | PROM Outputs | | |
| Rear Position | GCD | GCC | GCB | GCA | FA | BE | Distance From Object |
| H | L | L | L | L | L | L | 0 ≦ x < 2.5' |
| H | L | L | L | H | L | H | 2.5' ≦ x < 4.0' |
| H | L | L | H | L | L | H | 4.0' ≦ x < 5.6' |

TABLE A-continued

SEEKING FRONT POSITION

| Rear Position | Inputs to PROM | | | | | | PROM Outputs |
|---|---|---|---|---|---|---|---|
| | GCD | GCC | GCB | GCA | FA | BE | Distance From Object |
| H | L | L | H | H | L | H | 5.6' ≤ x < 7.1' |
| H | L | H | L | L | L | H | 7.1' ≤ x < 8.6' |
| H | L | H | L | H | L | H | 8.6' ≤ x < 10.2' |
| H | L | H | H | L | L | H | 10.2' ≤ x < 11.7' |
| H | L | H | H | H | L | H | 11.7' ≤ x < 13.3' |
| H | H | L | L | L | L | H | 13.3' ≤ x < 16.4' |
| H | H | L | L | H | L | H | 16.4' ≤ x < 19.5' |
| H | H | L | H | L | L | H | 19.5' ≤ x < 22.6' |
| H | H | L | H | H | L | H | 22.6' ≤ x < 25.6' |
| H | H | H | L | L | L | H | 25.6' ≤ x < 28.7' |
| H | H | H | L | H | L | H | 28.7' ≤ x < 31.8' |
| H | H | H | H | L | H | L | 31.8' ≤ x < 34.9' |
| H | H | H | H | H | H | L | 34.9' ≤ x < 38.0' |

Memory PROM is programmed to initially generate a logic 0, or low (L) bin-full signal on its BE output upon initial transmission and to subsequently generate the opposite binary logic 1, or high (H) bin-empty signal on its BE output when no echo is detected by transducer 34 within the time interval required for the ultrasonic beam to travel a predetermined distance into the bin at the speed of sound and for an echo to return. In the disclosed embodiment, PROM is programmed to generate a valid bin-empty logic 1 (H) output for a front position scan (REAR POSITION input is high—see Table A) when no echo is detected by transducer 34 in the time interval required for the ultrasonic beam to travel 2.5 feet at the speed of sound into the bin and for an echo to return to transducer 34 and to continue to generate such output signal until the pulses from the counter stored therein represent elapse of a time interval after initial transmission in which the beam can travel 31.8 feet and an echo can return. It will be noted from Table A that PROM is programmed so that its BE (bin-empty) output signal changes from low (L) to high (H) when a GCA pulse is stored therein and that the digital counter has progressed to a first predetermined count indicating that no echo has been detected in the time interval required for the ultrasonic beam to travel 2.5 feet into bin 26 and for an echo to return.

In the disclosed embodiment it is essential that an echo be returned in order to differentiate distances to a load within the bin 26. Assume that no load W2 is in the rear position and that an echo is reflected from the rear of the bin which is approximately 10 feet from the transducer. Upon receiving an echo as a result of reflection of the ultrasonic beam from the rear of the bin, transducer 34 converts the sound energy into electrical energy which is processed by analog circuit AC of board PC1 and then detected by digital circuit DC to produce an echo received signal on output lead MFLOG from PC1. Lead MFLOG is connected to the set (S) input of flip-flop FF2 whose Q output is coupled to the C input of data-storing output memory flip-flop FF3 which receives the BE (bin-empty) output from PROM on its D input. The logic 1, or high MFLOG signal applied to the S input of FF2 provides a logic 1, or high signal on its Q output which is applied to the clock (C) input of FF3 and sets FF3 and causes it to store the BE output from PROM on its Q output. Under such assumed conditions, with the programmable controller requesting a front position scan, the echo from the back of the bin 26 detected by transducer 34 will generate the MFLOG when the beam has traveled a distance greater than 8 feet and GCA is H, GCB is L, GCC is H and GCD is L (see Table A) and the BE output of PROM is high (H), thereby storing a logic 1, or high signal on the Q output of FF3 which is applied to the solid state relay A4 and causes it to provide a valid bin-empty reply over the BIN EMPTY interface line to the programmable controller.

The following table similarly shows the inputs to the PROM and the outputs therefrom when the programmable controller instruction requests scan of the rear bin position by applying a logic 0 or low (L) signal on the REAR POSITION input to the PROM:

TABLE B

SEEKING FRONT POSITION

| Rear Position | Inputs to PROM | | | | | | PROM Outputs |
|---|---|---|---|---|---|---|---|
| | GCD | GCC | GCB | GCA | FA | BE | Distance From Object |
| L | L | L | L | L | L | L | 0 ≤ x < 2.5' |
| L | L | L | L | H | L | L | 2.5' ≤ x < 4.0' |
| L | L | L | H | L | L | L | 4.0' ≤ x < 5.6' |
| L | L | L | H | H | L | L | 5.6' ≤ x < 7.1' |
| L | L | H | L | L | L | H | 7.1' ≤ x < 8.6' |
| L | L | H | L | H | L | H | 8.6' ≤ x < 10.2' |
| L | L | H | H | L | L | H | 10.2' ≤ x < 11.7' |
| L | L | H | H | H | L | H | 11.7' ≤ x < 13.3' |
| L | H | L | L | L | L | H | 13.3' ≤ x < 16.4' |
| L | H | L | L | H | L | H | 16.4' ≤ x < 19.5' |
| L | H | L | H | L | L | H | 19.5' ≤ x < 22.6' |
| L | H | L | H | H | L | H | 22.6' ≤ x < 25.6' |
| L | H | H | L | L | L | H | 25.6' ≤ x < 28.7' |
| L | H | H | L | H | L | H | 28.7' ≤ x < 31.8' |
| L | H | H | H | L | H | L | 31.8' ≤ x < 34.9' |
| L | H | H | H | H | H | L | 34.9' ≤ x < 38.0' |

Assume now that the programmable controller has requested a rear position scan in a double-deep bin so that optical isolator circuit A3 provides a logic 0 (L) REAR POSITION input to PROM. It will be noted from Table B that PROM is programmed under such conditions to initially generate a logic 0 (L) bin-full indication on its BE output upon initial transmission and to continue to generate such output until the pulse from the digital counter stored in the memory shows that the counter has proceeded to a second predetermined count indicating that no echo has been detected in the time interval required for the beam to travel at the speed of sound across the front position and a predetermined distance into the rear position of the bin and for an echo to return, and to thereafter generate a valid bin-empty high (H) signal on its BE output until the pulses from the digital counter stored in PROM show that the digital counter has proceeded to a third predetermined count indicating elapse of sufficient time after initial transmission for the beam to travel 31.8 feet and an echo to return. It will be noted from Table B that PROM is programmed to provide a valid bin-empty (H) signal on its BE output for a rear position scan for a distance X of $7.1' \leq X < 31.8'$. The signal on output BE from PROM will change from low (L) to high (H) when no echo has been detected after the beam has traveled 7.1 feet and the digital counter pulses stored in PROM are:

GCA is L
GCB is L
GCC is H
GCD is L

PROM is programmed to continue to generate a logic 1 valid bin-empty signal on its BE output for the time interval required for the beam to travel 31.8 feet and an echo to return. Assume that an echo is detected by transducer 34 when an echo is received from the rear of the bin which is approximately 10 feet from transducer 34 and the stored pulses show:

GCA is H
GCB is L
GCC is H
GCD is L

Under such conditions, PC1 will provide a logic 1 (H) signal on the MFLOG lead which is coupled to the S input of flip-flop FF2 to change its Q output to logic 1 (H) which is applied to the clock (C) input of data storage flip-flop FF3 and sets FF3 to store the logic 1 (H) signal from the BE output of PROM on its Q output, thereby coupling a logic 1 (H) signal to the solid state relay A4 to reply to the programmable controller over the BIN EMPTY interface lead that the rear position of the bin is empty.

The disclosed load detecting system is fail-safe in that it requires that a reflection be returned even if no load is in the bin being scanned. Memory PROM is programmed to provide a logic 1 (H) fault signal on its FA output if no echo is detected. If the apparatus is operating satisfactorily, a reflection from the rear of the bin will be detected by a transducer 34 from the rear of the bin which may be approximately 10 feet from the transducer. Memory PROM is programmed to generate a logic 1 (H) signal on its FA output if no echo is detected from an object 31.8 feet away from the transducer 34, i.e., when the following binary pulses are being generated by the digital counter and stored in PROM:

GCA is L
GCB is H
GCC is H
GCD is H

The logic 1 (H) signal on the FA output of PROM is coupled to the clock (C) input of output memory flip-flop FF4 which receives (after initial transmission) a logic 1 (H) signal on its D input from the $\overline{Q}$ output of flip-flop FF2. When PROM derives a logic 1 (H) signal on its FA lead (after elapse of sufficient time after initial transmission for the beam to travel 31.8 feet and an echo to return), such logic 1 signal is coupled to the clock (C) input of flip-flop FF4 which is then set with logic 1 (H) signal on its Q output that is applied to the solid state relay A5, thereby replying to the programmable controller over the FAULT interface line that a faulty condition exists in the load detecting system such as might occur if a transducer is faulty or is not aligned properly.

Output memory flip-flops FF3 and FF4 are cleared only when the request from the programmable controller for information is removed. Removal of the request from the RIGHT and LEFT interface lines causes the corresponding optical isolator circuit A1 or A2 to remove its logic 0 (L) output, thereby causing the output of exclusive NOR gate E∅1 to go to logic 1, or high. Such logic 1 output of E∅1 is converted by inverting gate NOT 2 to a logic 0 or low signal which applied to the CL input of output memory flip-flop FF4 to clear it. This will cause FF4 to derive a logic 1, or high signal on its $\overline{Q}$ output which is coupled to one input of an AND gate G2 that receives the logic 0 (low) signal on its other input from NOT 2, thereby changing the output of G2 to a logic 0 (low) signal which is coupled to the CL input of output memory flip-flop FF3 to clear it.

The embodiments of the invention in which an exclusive property or privilege as claimed are defined as follows:

1. An apparatus for signalling bin-full, bin-empty and "no echo" conditions in scanning a storage rack bin that has an open end, the apparatus comprising:
   ranging means positioned adjacent said open end for transmitting an ultrasonic signal into said bin and for detecting an echo of said ultrasonic signal, said ranging means including means for generating timing signals for successive elapsed times from the transmission of said ultrasonic signal;
   means coupled to said ranging means for generating a bin-full signal in response to said timing signals for one of said elapsed times within a first time range corresponding to a first distance range;
   means coupled to said ranging means for generating a bin-empty signal in response to said timing signals for another one of said elapsed times within a second time range corresponding to a second distance range; and
   means coupled to said ranging means for generating a "no echo" signal in response to said timing signals for another one of said elapsed times beyond said first and second time ranges.

2. The apparatus of claim 1, further comprising bin indicator means coupled for receiving said bin-empty signal, said bin indicator means also being coupled to said ranging means and being responsive to the detection of the echo during said second time range for storing said bin-empty signal for input to an external controller.

3. The apparatus of claim 2, wherein said bin indicator means is also coupled to receive said bin-full signal, the bin indicator means being responsive to the detection of the echo during said first time range for storing said bin-full signal for input to the external controller.

4. The apparatus of claim 1, further comprising fault indicator means coupled for receiving and storing said "no echo" signal for input to an external controller, said fault indicating means being coupled to said ranging means to be enabled to receive and store said "no echo" signal.

5. The apparatus of claim 1, wherein said means for generating the bin-full signal is responsive to a position signal from an external controller to adjust the length of said first time range and the corresponding distance range in which said bin-full signal is generated.

6. The apparatus of claim 1, wherein said means for generating the bin-empty signal is responsive to a position signal from an external controller to adjust the length of said second time range and the corresponding distance range for which said bin-empty signal is generated.

7. An apparatus for signalling bin-full, bin-empty and "no echo" conditions in scanning a storage rack bin that has an open end, the apparatus comprising:
   ranging means positioned adjacent said open end for transmitting an ultrasonic signal into said bin and for detecting an echo of said ultrasonic signal, said ranging means including means for generating count signals representing successive times from transmission of said ultrasonic signal; and
   programmed memory means coupled to receive said count signals from said ranging means, said programmed memory means storing bin-full signals, bin-empty signals and "no echo" signals, and being responsive to said count signals to transmit (i) a bin-full signal when said count signals correspond to a time in a first time range, (ii) a bin-empty signal when said count signals correspond to a time in a second time range, and (iii) a "no echo" signal when said count signals correspond to a time extending beyond said first and second time ranges.

8. The apparatus of claim 7, further comprising bin indicator means coupled to receive said bin-empty signal from said programmed memory means, said bin indicator means also being coupled to said ranging means and being responsive to the detection of the echo during said second time range, to store said bin-empty signal for input to an external controller.

9. The apparatus of claim 8, wherein said bin indicator means is also coupled to receive said bin-full signal, said bin indicator means being responsive to the detection of the echo during said first time range to store said bin-full signal for input to the external controller.

10. The apparatus of claim 7, further comprising fault indicator means coupled for receiving and storing said "no echo" signal for input to an external controller, said fault indicator means being coupled to said ranging means to be enabled to receive said "no echo" signal.

11. The apparatus of claim 7, wherein said programmed memory means is responsive to a position signal from an external controller to adjust the length of said first time range for which said bin-full signal will be transmitted in response to said count signals.

12. The apparatus of claim 7, wherein said programmed memory means is responsive to a position signal from an external controller to adjust the length of said second time range for which said bin-empty signal will be transmitted in response to said count signals.

13. A method for generating bin-full, bin-empty and "no echo" signals in scanning a storage rack bin that has an open end, the method comprising:
   transmitting an ultrasonic signal into said bin, and then detecting any echo of said ultrasonic signal;
   generating timing signals representing a plurality of elapsed times from the transmission of said ultrasonic signal;
   generating a bin-full signal in response to said timing signals for a first one of the elapsed times;
   generating bin-empty signals in response to said timing signals for elapsed times within a time range following said first one of the elapsed times; and
   generating a "no echo" signal in response to timing signals for another one of the elapsed times that is beyond said time range associated with the bin-empty signals.

14. The method of claim 13, further comprising the step of storing one of said bin-empty signals upon the detection of an echo of said ultrasonic signal, said bin-empty signal being stored at a location accessible to an external controller.

15. The method of claim 13, further comprising the step of storing said bin-full signal upon the detection of an echo of said ultrasonic signal, said bin-full signal being stored at a location accessible by an external controller.

16. The method of claim 13, further comprising the step of storing said "no echo" signal when an echo has not been detected through said first elapsed time associated with the bin-full signal and through said time range associated with the bin-empty signals.

17. The method of claim 13, further comprising the step of providing, in response to a position signal from an external controller, additional elapsed times for generating bin-full signals in response to said timing signals.

18. The method of claim 13, further comprising the step of adjusting, in response to a position signal from an external controller, said time range for generating bin-empty signals in response to said timing signals.

* * * * *